(12) United States Patent
Zheng et al.

(10) Patent No.: US 11,235,668 B1
(45) Date of Patent: Feb. 1, 2022

(54) EFFICIENT CONTROL SYSTEM AND METHOD FOR BRUSHLESS MOTOR WITH WIDE WORKING RANGE

(71) Applicant: Zhejiang University, Hangzhou (CN)

(72) Inventors: Yao Zheng, Hangzhou (CN); Junyin Chen, Hangzhou (CN); Changping Du, Hangzhou (CN); Guanghua Song, Hangzhou (CN); Rui Yang, Hangzhou (CN); Zhixian Ye, Hangzhou (CN); Zekun Zhang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/367,913

(22) Filed: Jul. 6, 2021

(30) Foreign Application Priority Data

Jul. 28, 2020 (CN) .......................... 202010739605.8

(51) Int. Cl.
| | |
|---|---|
| *H02P 6/00* | (2016.01) |
| *B60L 50/52* | (2019.01) |
| *B60L 50/60* | (2019.01) |
| *H02P 7/292* | (2016.01) |

(52) U.S. Cl.
CPC ............... B60L 50/52 (2019.02); B60L 50/60 (2019.02); H02P 7/292 (2013.01); *B60L 2200/10* (2013.01); *B60L 2210/10* (2013.01); *B60L 2240/427* (2013.01)

(58) Field of Classification Search
CPC ...... B60L 50/52; B60L 50/60; B60L 2700/10; B60L 2200/10; B60L 2240/427; H02P 7/292; H02P 4/00; H02P 5/00
See application file for complete search history.

(56) References Cited

U.S. PATENT DOCUMENTS

2015/0184637 A1* 7/2015 Vander Lind ............. F03D 9/25
290/44

FOREIGN PATENT DOCUMENTS

| CN | 106532897 A | 3/2017 |
|---|---|---|
| CN | 106598074 A | 4/2017 |
| CN | 108791819 A | 11/2018 |

\* cited by examiner

*Primary Examiner* — Karen Masih
(74) *Attorney, Agent, or Firm* — Leveque Intellectual Property Law, PC

(57) ABSTRACT

The present disclosure provides an efficient control system and method for a brushless motor with a wide working range, which are applied to an aerospace vehicle energy system. The system of the present disclosure includes a power supplying module, a first DC-DC circuit, a battery pack, a second DC-DC circuit, an anti-reverse-connection circuit, an electronic speed control (ESC), a brushless direct current motor (BLDC), an airborne controller and a communication link. Electric energy from the power supplying module is configured to charge the battery pack via the first DC-DC circuit, and electric energy of the battery pack sequentially flows through the second DC-DC circuit and the anti-reverse-connection circuit to energize the ESC, wherein output voltage of the second DC-DC circuit and throttle signal input of the ESC are controlled in real time by the airborne controller according to a power demand of an aircraft.

8 Claims, 2 Drawing Sheets

001
EFFICIENT CONTROL SYSTEM AND METHOD FOR BRUSHLESS MOTOR WITH WIDE WORKING RANGE

CROSS REFERENCE TO RELATED APPLICATIONS

This patent application claims the benefit and priority of Chinese Patent Application No. 202010739605.8 filed on Jul. 28, 2020, the disclosure of which is incorporated by reference herein in its entirety as part of the present application.

TECHNICAL FIELD

The present disclosure pertains to the technical field of aerospace vehicle energy systems, and particularly relates to an efficient control system and method for a brushless motor with a wide working range.

BACKGROUND

For some specific brushless power systems (such as a long-endurance electric Unmanned Aerial Vehicle (UAV) and a tilting electric UAV capable of vertical taking-off and landing) a working range is required to be wide. However, it is difficult to achieve efficient power output in a wide working range through a traditional constant-voltage drive control method. For example, for the long-endurance electric UAV, the power required during a cruise phase is low, which is lower than ¼ of a rated power of a brushless direct current motor (BLDC), and deviates from a high efficiency section of the power system. When it comes to the tilting electric UAV capable of vertical taking-off and landing, the same set of power unit is adopted for vertical take-off and horizontal cruise, and a required power value difference between these two operating states is huge. If the conventional constant-voltage drive method is used, an operating voltage for the system is usually determined by satisfying the requirements of vertical takeoff, which leads to low efficiency of the power system when the UAV is flying horizontally.

SUMMARY

The present disclosure advantageously provides an efficient control system and method for a brushless motor with a wide working range against the deficiencies in the prior art. The present disclosure can realize power output within a certain voltage range by means of a battery pack connected in series with a DC-DC circuit, and jointly adjust and control an input voltage of an Electronic Speed Control (ESC) and throttle input of the ESC through a corresponding control strategy, thereby improving overall efficiency of a power system, and realizing efficient output of the system within a wide working range.

The present disclosure is implemented with the following technical solutions.

An efficient control system for a brushless motor with a wide working range includes a power supplying module, a first DC-DC circuit, a battery pack, a second DC-DC circuit, an anti-reverse-connection circuit, an ESC, a brushless direct current motor (BLDC), an airborne controller and a communication link, wherein the power supplying module outputs regulated direct currents to energize the battery pack through the first DC-DC circuit; wherein the battery pack energizes the ESC through the second DC-DC circuit and the anti-reverse-connection circuit in sequence, and the ESC drives the BLDC to rotate; wherein the second DC-DC circuit uses an adjustable DC-DC circuit which can change an output voltage according to an input signal; wherein the communication link is configured to transmitting an original throttle value output by a flight control system to the airborne controller; and wherein the airborne controller can acquire input/output voltage and current information from the first DC-DC circuit and output voltage and current information of the battery pack for monitoring, make the original throttle value transmitted from the communication link correspond to a power demand of a power system, output two control signals according to a relationship between a power demand of a current aircraft and a set power threshold, and a first control signal is output to the ESC for controlling throttle thrust of the ESC, and a second control signal is output to the second DC-DC circuit for controlling the second DC-DC circuit to output a matched voltage.

Furthermore, in the above technical solution, the system further includes a voltage regulation module for providing a stable power supply for an airborne apparatus.

Further, the power supplying module is implemented by photovoltaic energization, fuel cell energization and fuel generator energization, and single-channel or multi-channel parallel energization can be adopted.

Further, the first DC-DC circuit and the second DC-DC circuit may be a BUCK-type circuit, a synchronous BUCK-type circuit or a BUCK-BOOST-type circuit.

An efficient control method for a brushless motor with a wide working range is implemented based on the above system. The control method includes receiving, by the airborne controller, the original throttle signal output by the flight control system via a communication link, and mapping the original throttle signal to the power demand of the power system so as to obtain the power demand of the power system at a current time point; and determining the power demand of the power system: when the power demand of the power system is less than or equal to a preset power threshold, outputting, by the airborne controller, the control signal of the ESC to change an actual throttle value, and simultaneously controlling, by the airborne control system, the second DC-DC circuit to energize with a reference voltage; and when the power demand of the power system is greater than the preset power threshold, simultaneously changing, by the airborne controller, the throttle thrust of the ESC and the output voltage of the second DC-DC circuit according to a joint adjustment strategy so as to realize high-power power output.

In the above control method, the reference voltage is the lowest voltage of actually output by the second DC-DC circuit, that is, the lowest voltage supported by the ESC.

Further, the joint adjustment strategy is to consult a pre-obtained power matching table, so as to output throttle thrust of the ESC and an output voltage of the second DC-DC circuit corresponding to demanded power, and the power matching table records an operating voltage and throttle thrust of the ESC corresponding to the optimal efficiency of the system under different power demands. Still further, the power matching table may be obtained through a wind tunnel test by obtaining an efficiency curve of a power device with equal power output under a target working condition firstly, and then recording an operating voltage and throttle thrust corresponding to the highest efficiency point on the curve one by one, and recording an operating voltage, the throttle thrust and power corresponding to the highest point in each efficiency curve so as to obtain the power matching table, different equal power outputs respectively corresponding to respective efficiency curves.

Alternatively, the joint adjustment strategy may be a dynamic tracking algorithm aiming at tracking the highest real-time efficiency of the power system by additionally mounting a corresponding force sensor on a power system, which can be found in CN 108791819A.

Further, the mapping the original throttle signal to a power demand of a power system may use linear mapping to uniquely map the original throttle signal to a power interval.

Compared with the prior art, the present disclosure has obtained the following beneficial effects.

The present disclosure overcomes the defects of simplex operating point and low efficiency at non-design points in a conventional constant-voltage and variable-throttle-thrust control method of brushless motor. The solution design of the present disclosure innovatively controls the power system based on the idea of variable voltage and variable throttle thrust. Specifically, the input voltage and throttle signal of the ESC may be jointly adjusted and controlled according to a given power demand, so that the system can output efficiently under a wide working range, wherein the working range refers to a power range within which the power system may output the power efficiently, and the wide working range means that the power system may output power efficiently in a wide power range. Although the traditional constant-voltage and variable-throttle-thrust scheme may realize from zero to maximum power output of a current operating voltage, the efficiency of the system is often not high when deviating from a rated power value, and therefore cannot be considered as operating under the so-called wide working range as referred in the present disclosure. The technical effects of the present disclosure may be proved by FIG. 3. FIG. 3 is an efficiency diagram of a power system with equal power output of 60 W. The operating state of 60 W output is analyzed, and for the power system of this embodiment, if the conventional brushless motor control system is adopted, an operating voltage within 22-25 V is usually adopted to guarantee to achieve maximum power output of the system as well as match an actual voltage range of the battery pack. It may be seen from the figure that under this operating voltage, the efficiency of the power system is about 69%, and with the solution of the present disclosure, the operating voltage of the power system may accurately match an optimal operating voltage of 12.2 V. At this time, the efficiency of the power system is 80.5%, which is 16.67% higher than that of the conventional solution.

In addition, the present disclosure is based on the creative idea of brushless motor control with the variable voltage and variable throttle thrust, which not only enables the battery pack to supply power to the ESC with a specific voltage so as to satisfy power output within a certain power range, but also supplies power to the ESC only via the adjustable DC-DC circuit when the system needs to output at other power values. Compared with the above solution, the present disclosure is improved in the following aspects. If the battery pack is configured to directly supply power, it usually may not accurately match an optimal voltage value due to voltage characteristics of the battery pack. For example, a lithium battery pack having fully charged at 12.6 V has a voltage in a range of 10.5 V-12.6 V in an operating state, while an operating voltage corresponding to an actual optimal efficiency point may be 11.5 V. That is to say, it will deviate from the optimal operating point. The actual operating voltage is not the optimal operation voltage if the battery pack is configured as direct power supply. This is the case especially when the efficiency curve of the system presents an obvious peak during equal power output. However, when the solution of the present disclosure is adopted, the second DC-DC circuit supplies power to the ESC regardless of the actual voltage of the battery pack, which may guarantee that the operating voltage of the system is always at a relatively accurate value (that is, the optimal operating voltage in the power matching table mentioned in the present disclosure), and further guarantee the system efficiency.

The solution of the present disclosure is designed to be highly applicable for the practical application objects, and may be realized by retrofitting the existing traditional solution and adding the adjustable DC-DC circuit and the airborne controller module.

The control over brushless motor with a wide working range is based on the considerations as follows. Specifically, in the traditional solution, for various power supplying modules, such as a photovoltaic module, a fuel cell and a fuel power generation device, a battery pack with a relatively high voltage is usually connected thereafter to meet a demand of high power output of the power system. Based on the solution of the present disclosure, the battery pack in the traditional solution does not need to be replaced, and the adjustable DC-DC circuit and the airborne controller may be directly added to original circuit wiring to upgrade the original scheme, so as to improve a performance of the power system, and enable the efficient system power output in a wide working range.

Figure 1:
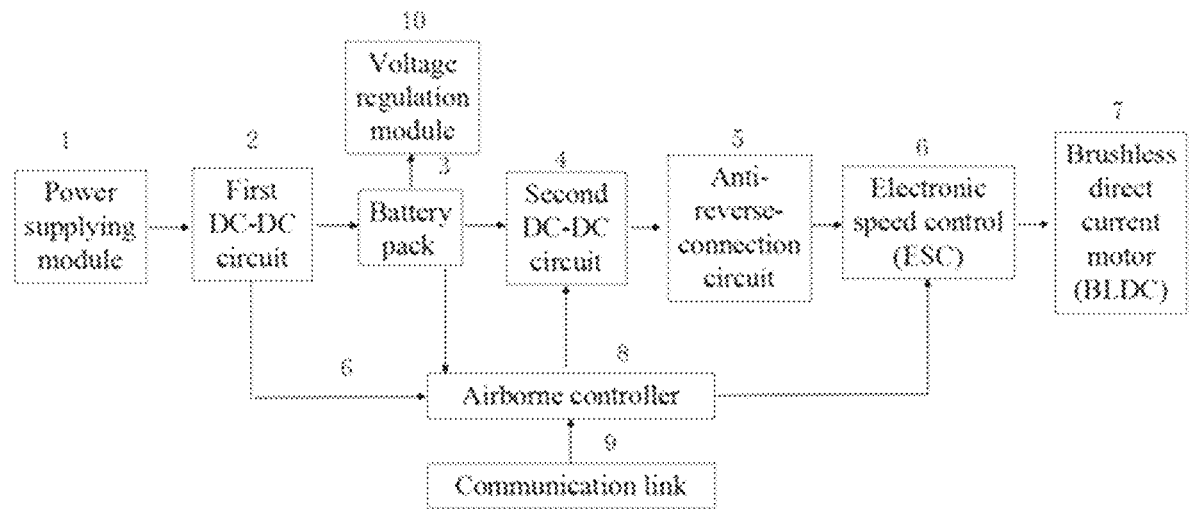
FIG. 1 is a structural schematic diagram of an efficient control system for a brushless motor with a wide working range according to the present disclosure.

Reference numerals in the figures include 1—power supplying module; 2—first DC-DC circuit; 3—battery pack; 4—second DC-DC circuit; 5—anti-reverse-connection circuit; 6—(electronic speed control) ESC; 7—brushless direct current motor (BLDC); 8—airborne controller; 9—communication link; and 10—voltage regulation module.

DETAILED DESCRIPTION

The present disclosure will be further described below with reference to accompanying drawings and in conjunction with particular embodiments.

As shown in FIG. 1, this embodiment mainly provides an efficient control system for a brushless motor with a wide working range, which includes a power supplying module, a first DC-DC circuit, a battery pack, a second DC-DC circuit, an anti-reverse-connection circuit, an electronic speed control (ESC), a brushless direct current motor (BLDC), an airborne controller, a communication link and a voltage regulation module.

The power supplying module energizes the battery pack via the first DC-DC circuit. The power supplying module may be configured to be implemented by photovoltaic energizing, fuel cell energizing or fuel generator energizing, in the form of single-channel or multi-channel parallel energizing. In a particular embodiment, if the power supplying module is configured as a photovoltaic module for supplying power, due to special I-V characteristics of a photovoltaic cell, an MPPT controller, that is, a maximum power point tracking controller, is usually added between the power supplying module and the first DC-DC circuit, for adjusting circuit parameters to achieve maximum power output of the photovoltaic module. If the power supplying module is configured as a fuel cell for supplying power, since power generation efficiency of the fuel cell is related to the magnitude of its output voltage, the fuel cell is usually set at a rated voltage to achieve efficient output of a fuel cell stack. At this time, the first DC-DC circuit is configured as a DC voltage regulation unit and charges the battery pack. If the power supplying module is configured as a fuel generator for supplying power, an output voltage is unstable due to fluctuation of the speed of an engine, and the first DC-DC circuit is also used for DC voltage regulation and charges the battery pack. The first DC-DC circuit may be configured as a BUCK-type circuit, a synchronous BUCK-type circuit or a BUCK-BOOST-type circuit, such as an LM2577 boost digital display module, a DSN6000AUD automatic buck-boost module, an LM317 buck circuit board and an AP-D5830A adjustable buck module.

Electric energy of the battery pack sequentially flows through the second DC-DC circuit and the anti-reverse-connection circuit to supply power for the ESC, and the ESC drives the BLDC to rotate. The second DC-DC circuit is an adjustable DC-DC circuit, which changes an output voltage according to an input signal, and may be configured as the BUCK-type circuit, the synchronous BUCK-type circuit or the BUCK-BOOST-type circuit, such as AP-D5830A. The DC-DC buck module outputs constant-voltage DC with an external voltage and current analog signal input terminal, and a single-chip microcomputer may be configured to control and adjust voltage and current. The anti-reverse-connection circuit is mainly configured to prevent reverse connection, which may be a conventional anti-reverse-connection circuit, such as a low-dropout ideal diode with a maximum operating current of 15 A from Maikesi. During conduction, voltage drops across a metal-oxide-semiconductor field effect transistor (MOSFET) are only 20 mV. A 100V 50 A ideal diode from Jiadi may also be adopted, of which a static operating current is 0.6-1.5 mA, design of dual metal oxide semiconductors (MOS) is used and internal conduction resistance is merely 0.75 milliohm. Alternatively, the anti-reverse-connection circuit is configured to include at least one MOS transistor and a diode controller, the MOS transistor internally includes at least one diode, a source (S) electrode of the MOS transistor is arranged at an input terminal of the anti-reverse-connection circuit, a drain (D) electrode of the MOS transistor is arranged at the output terminal of the anti-reverse-connection circuit, an input terminal of the diode controller is connected to the S electrode of the MOS transistor, an output terminal of the diode controller is connected to the D electrode of the MOS transistor, and a driving terminal of the diode controller is connected to the gate (G) electrode of the MOS transistor.

The communication link is configured to transmit an original throttle value output by a flight control system to the airborne controller.

A main control chip of the airborne controller may be configured as stm32, 51, AVR, PIC and other types of single-chip microcomputers, and cooperate with a corresponding peripheral circuit, such as a voltage and current sensor—LTC2944 voltage and current measurement module, which may acquire input/output voltage and current information from the first DC-DC circuit and output voltage and current information of the battery pack for monitoring in real time, may make the original throttle value transmitted from the communication link correspond to a power demand of a power system, and output, according to a relationship between a power demand of a current aircraft and a preset power threshold, a first control signal to the ESC for controlling throttle thrust of the ESC, and a second control signal to the second DC-DC circuit at the same time for outputting a matched voltage value. The preset power threshold may generally be set by those skilled in the art according to experience or task requirements, for example, 15% of maximum continuous operating power of the power system may be set in the case of no experience or no specific task requirements. As in a particular embodiment, the maximum continuous operating power of the power system is 200 W, then the power threshold may be set at 15% of 200 W, that is, 30 W.

The voltage regulation module is configured to provide a stable power supply for an airborne apparatus, and may adopt an integrated circuit to convert the output voltage of the battery pack into 12 V voltage or 5 V voltage through an LT8632 chip. The voltage regulation module is provided with protection circuits such as a filter circuit and an isolation circuit, so as to stabilize each output voltage linearly.

Figure 2:
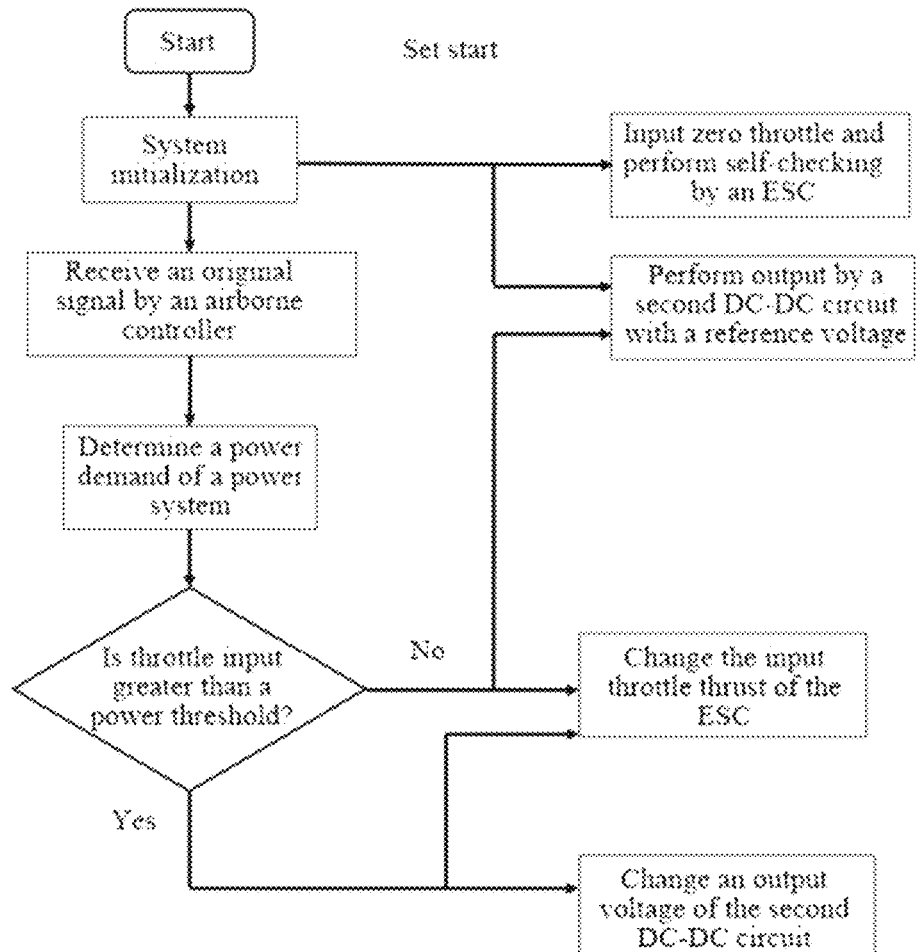
FIG. 2 is a workflow chart of the efficient control system for a brushless motor with a wide working range according to the present disclosure.

FIG. 2 illustrates a workflow chart implemented by using a system of this embodiment, and is used to describe an efficient control method for a brushless motor with a wide working range implemented based on the above system. When the system is initialized, a throttle signal input to the ESC is zero, and the second DC-DC circuit is simultaneously controlled to output with a reference voltage. In this way, the ESC executes a self-checking program.

The airborne controller receives, through a communication link, an original throttle signal output by a flight control system, and the original throttle signal is mapped to the power demand of the power system so as to obtain a power demand of the power system at the current time point; and the power demand of the power system is determined:

when the power demand is less than or equal to a preset power threshold, the airborne control system outputs a control signal of the ESC to change an actual throttle value, and simultaneously controls a second DC-DC circuit to energize with a reference voltage; and when the power demand is greater than the preset power threshold, the airborne control system simultaneously changes throttle thrust of the ESC and the output voltage of the second DC-DC circuit according to a joint adjustment strategy, so as to realize the high-power power output.

In a particular embodiment, the power threshold is set at 30 W, and its physical meaning is that when the required power demand of the system is less than or equal to 30 W, a method for regulating the throttle by constant-voltage is adopted, and when an actual power demand is greater than 30 W, the joint adjustment strategy is adopted to jointly adjust and control both the operating voltage and ESC input.

The power threshold is a value input in advance, which is used to determine whether to transform the voltage of the second DC-DC circuit, and is generally set at 15% of maximum continuous operating power of the power system. The reference voltage is the lowest voltage actually output by the second DC-DC circuit, which is determined by the lowest voltage supported by the ESC, and may be the lowest voltage required by the ESC. In a particular embodiment, the ESC supports input of 3S-6S lithium batteries, and accordingly, the reference voltage is set at the lowest operating voltage of 3S lithium batteries, that is 11.1 V.

The joint adjustment strategy may be implemented by consulting a known power matching table, so as to correspondingly output the throttle thrust of the ESC and the output voltage of the second DC-DC circuit, or alternatively, it may be implemented by a dynamic tracking algorithm with the objective of tracking the highest real-time efficiency of the power system by additionally mounting a corresponding force sensor on a power system.

The above power matching table records an operating voltage and throttle thrust of the ESC corresponding to the optimal efficiency of the system under different power demands. An efficiency curve of a power device with equal power output under a target working condition may be obtained in advance through a wind tunnel test, the operating voltage and throttle thrust corresponding to the highest efficiency point on the curve as well as the power are recorded one by one, and efficiency curves of different equal power outputs may be processed in the same way, such that the power matching table may be obtained.

Figure 3:
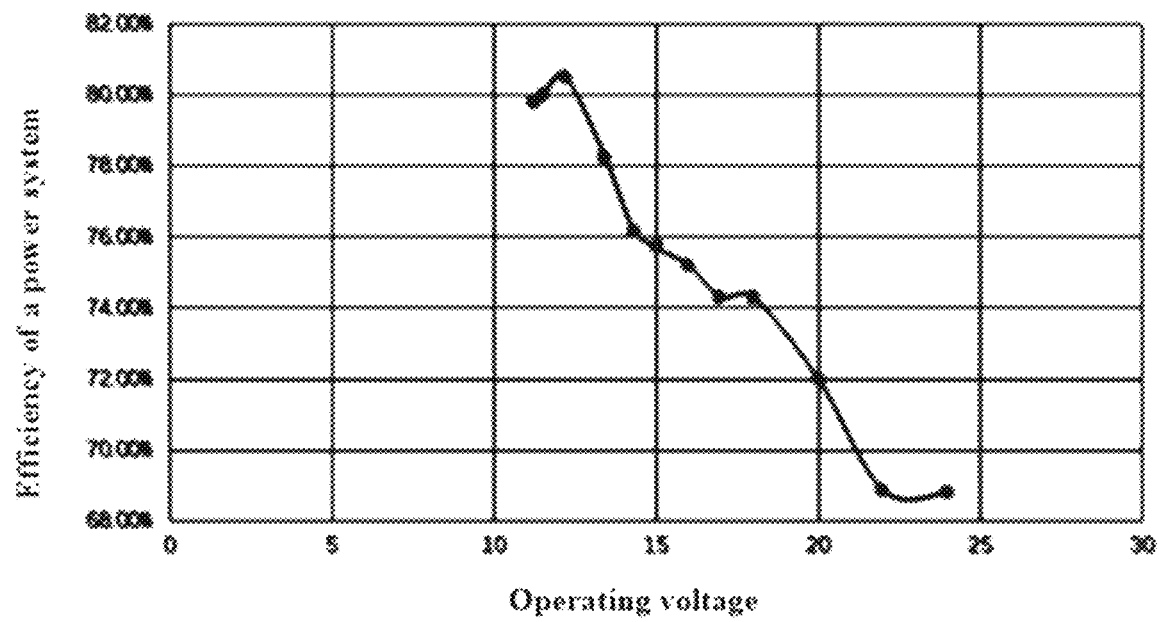
FIG. 3 is an equal power output system efficiency curve (equal power output of 60 W) for creating a power matching table.

A creation flow of the power matching table is described below in detail with reference to an efficiency diagram of the equal power output system in FIG. 3.

A power test frame is used to constantly adjust an input voltage of the power system and the throttle thrust of the ESC to guarantee equal power output. In a particular embodiment, as shown in the efficiency diagram in FIG. 3, the power system always maintains equal power output of 60 W, so as to obtain the efficiency diagram of the power system at different operating voltages. In FIG. 3, the operating voltage of the system changes from 10.5 V to 24 V. Although output power remains unchanged, it may be seen that a maximum efficiency point of the power system appears when the operating voltage is 12.2 V, and efficiency of the system exceeds 80%. Then, it may be recorded: when the system is operated with equal power output 60 W, an optimal operating voltage should be 12.2 V, and the efficiency of the system at this time point is 80.5%. By repeating such process, the respective optimal operating voltages under different working conditions and different power output of the power system may be acquired, and then the above power matching table can be obtained.

The dynamic tracking algorithm may be found from relevant contents in CN 108791819A in which a dynamic tension detection device and detection method suitable for an unmanned aerial vehicle are disclosed, an optimal efficiency value of a tracking system is achieved through automatic pitch variation, which essentially tracks an optimal propeller efficiency value of the whole power system, that is, how much dynamic tension may be brought by power output per watt. The same idea may be used for establishment of the dynamic tracking algorithm of the present disclosure. Since the power system constantly changes the operating voltage and throttle output and guarantees the output power to be substantially stable, real-time dynamic tension detected by the dynamic tension detection device may also be different due to efficiency differences of the power system under different operating voltages, and a function of dynamically tracking the highest efficiency of the system may be achieved by constantly approaching a maximum value of the real-time tension at a same power.

In a particular embodiment, mapping the original throttle signal to the power demand of the power system may directly use linear mapping. As an example, 0-100% of the original throttle signal is linearly mapped to a power interval of 0-200 W, that is, 0% of the original throttle signal corresponds to the power demand of 0 W, 30% of the throttle signal corresponds to the power demand of 60 W, 60% of the original throttle signal corresponds to the power demand of 120 W, and 100% of the original throttle signal corresponds to the power demand of 200 W.

The control system and method of the present disclosure may guarantee that the ESC may always operate at an optimal operating voltage point (instead of only operating in an optimal operating voltage interval), such that the whole power system is able to maintain efficient power output in the wide working range.

What is claimed is:

1. An efficient control method for a brushless motor with a wide working range, comprising:
   at a system including a power supplying module, a first DC-DC circuit, a battery pack, a second DC-DC circuit, an anti-reverse-connection circuit, an electronic speed control (ESC), a brushless direct current motor (BLDC), an airborne controller, a communication link, wherein the power supplying module outputs regulated direct currents to energize the battery pack through the first DC-DC circuit; wherein the battery pack energizes the ESC through the second DC-DC circuit and the anti-reverse-connection circuit in sequence, and the ESC drives the BLDC to rotate; wherein the second DC-DC circuit uses an adjustable DC-DC circuit, which changes an output voltage according to an input signal; wherein the communication link is configured to transmit an original throttle signal output by a flight control system to the airborne controller; and wherein the airborne controller is configured to acquire input/output voltage and current information from the first DC-DC circuit and output voltage and current information of the battery pack for monitoring, make the original throttle signal transmitted from the communication link correspond to a power demand of a power system, output two control signals according to a relationship between a power demand of a current aircraft and a set power threshold, and a first control signal is output to the ESC for controlling throttle thrust of the ESC, and a second control signal is output to the second DC-DC circuit for controlling the second DC-DC circuit to output a matched voltage:
   receiving, by the airborne controller, the original throttle signal output by the flight control system via a communication link, and mapping the original throttle signal to the power demand of the power system so as to obtain the power demand of the power system at a current time point; and
   determining the power demand of the power system, including:
      when the power demand of the power system is less than or equal to a preset power threshold, outputting, by the flight control system, the control signal of the ESC to change an actual throttle value, and simultaneously controlling, by the airborne controller, the second DC-DC circuit to energize with a reference voltage, the reference voltage being the lowest voltage output by the second DC-DC circuit that is the lowest voltage supported by the ESC; and
      when the power demand of the power system is greater than the preset power threshold, simultaneously changing, by the airborne controller, the throttle thrust of the ESC and the output voltage of the second DC-DC circuit according to a joint adjustment strategy so as to realize high-power power output.

2. The efficient control method for a brushless motor with a wide working range according to claim 1, wherein the system further comprises a voltage regulation module for providing a stable power supply for an airborne apparatus.

3. The efficient control method for a brushless motor with a wide working range according to claim 1, wherein the power supplying module includes photovoltaic energization, fuel cell energization and fuel generator energization, with single-channel energization or multi-channel parallel energization.

4. The efficient control method for a brushless motor with a wide working range according to claim 1, wherein the first DC-DC circuit and the second DC-DC circuit are a BUCK-type circuit or a BUCK-BOOST-type circuit.

5. The efficient control method for a brushless motor with a wide working range according to claim 1, wherein the joint adjustment strategy consults a pre-obtained power matching table, so as to output the throttle thrust of the ESC and the output voltage of the second DC-DC circuit corresponding to demanded power, wherein the power matching table records an operating voltage and the throttle thrust of the ESC corresponding to an optimal efficiency of the system under different power demands.

6. The efficient control method for a brushless motor with a wide working range according to claim 5, wherein the power matching table is obtained through a wind tunnel test by firstly obtaining an efficiency curve of a power device with equal power output under a target working condition, and then recording the operating voltage and the throttle thrust corresponding to a highest efficiency point on the efficiency curve one by one, and recording an operating voltage, the throttle thrust and power corresponding to a highest point in each efficiency curve so as to obtain the power matching table, different equal power outputs respectively corresponding to respective efficiency curves.

7. The efficient control method for a brushless motor with a wide working range according to claim 1, wherein the joint adjustment strategy includes additionally mounting a corresponding force sensor on a power system and incorporating a dynamic tracking algorithm to track the highest real-time efficiency of the power system.

8. The efficient control method for a brushless motor with a wide working range according to claim 1, wherein the mapping the original throttle signal to the power demand of the power system uses linear mapping.

* * * * *